US012780669B2

(12) United States Patent
Xiao et al.

(10) Patent No.: US 12,780,669 B2
(45) Date of Patent: Nov. 3, 2026

(54) ANODE MATERIAL, PREPARATION METHOD THEREOF, AND SECONDARY BATTERY

(71) Applicant: BTR NEW MATERIAL GROUP CO., LTD., Shenzhen (CN)

(72) Inventors: Chengmao Xiao, Shenzhen (CN); Peng He, Shenzhen (CN); Eming Guo, Shenzhen (CN); Jianguo Ren, Shenzhen (CN); Xueqin He, Shenzhen (CN)

(73) Assignee: BTR NEW MATERIAL GROUP CO., LTD., Shenzhen (CN)

( * ) Notice: Subject to any disclaimer, the term of this patent is extended or adjusted under 35 U.S.C. 154(b) by 468 days.

(21) Appl. No.: 18/563,849

(22) PCT Filed: Jun. 8, 2023

(86) PCT No.: PCT/CN2023/099090

§ 371 (c)(1),
(2) Date: Nov. 22, 2023

(87) PCT Pub. No.: WO2024/066462

PCT Pub. Date: Apr. 4, 2024

(65) Prior Publication Data

US 2024/0367982 A1 Nov. 7, 2024

(30) Foreign Application Priority Data

Sep. 29, 2022 (CN) ......................... 202211199579.X

(51) Int. Cl.
*C01B 3/02* (2026.01)
*C01B 33/02* (2006.01)

(52) U.S. Cl.
CPC .......... *C01B 33/02* (2013.01); *C01P 2002/72* (2013.01); *C01P 2004/03* (2013.01);
(Continued)

(58) Field of Classification Search
CPC ........ H01M 4/386; H01M 4/483; C01B 33/02
(Continued)

(56) References Cited

U.S. PATENT DOCUMENTS

2020/0295351 A1 9/2020 Piao et al.
2021/0122639 A1* 4/2021 Choi .................... H01M 4/366
(Continued)

FOREIGN PATENT DOCUMENTS

CN 109713280 A 5/2019
CN 111682177 A 9/2020
(Continued)

OTHER PUBLICATIONS

Japan Patent Office, Office Action Issued in Application No. 2023-570326, Feb. 4, 2025, 12 pages. (Submitted with Machine Translation).

(Continued)

*Primary Examiner* — James M Erwin
(74) *Attorney, Agent, or Firm* — McCoy Russell LLP

(57) ABSTRACT

An anode material, a preparation method thereof, and a secondary battery provided. The anode material includes a secondary particle, the secondary particle includes aggregated primary particles, and the primary particle and the secondary particle satisfy following relationships: $10 \le D2_{50}/D1_{max} \le 40$ (I), $D2_{min}/D2_{50} \ge 0.08$ (II) and $D2_{50}/D2_{max} \ge 0.24$ (III), in Formulas (I), (II) and (III), $D1_{max}$ represents a maximum particle size of the primary particle, $D2_{50}$ represents a median particle size of the secondary particle, $D2_{min}$ represents a minimum particle size of the secondary particle, and $D2_{max}$ represents a maximum particle size of the secondary particle. By defining particle size relationship between the primary particle and the secondary particle, and particle size distribution of the secondary particle, the primary particle and the secondary particle have a good match-
(Continued)

ing degree, which improve cycling stability of the anode material and at the same time reduce volume expansion effect of the anode material.

10 Claims, 3 Drawing Sheets

(52) U.S. Cl.
CPC ...... *C01P 2004/32* (2013.01); *C01P 2004/45* (2013.01); *C01P 2004/51* (2013.01); *C01P 2004/61* (2013.01); *C01P 2004/84* (2013.01); *C01P 2006/12* (2013.01); *C01P 2006/40* (2013.01)

(58) Field of Classification Search
USPC ........................................................ 429/231.8
See application file for complete search history.

(56) References Cited

U.S. PATENT DOCUMENTS

| | | | | |
|---|---|---|---|---|
| 2021/0408520 | A1 * | 12/2021 | Choi | C01B 32/20 |
| 2022/0302448 | A1 * | 9/2022 | Hoshina | H01M 4/525 |
| 2024/0217828 | A1 * | 7/2024 | Lee | C01B 32/205 |

FOREIGN PATENT DOCUMENTS

| | | | |
|---|---|---|---|
| CN | 113226986 | A | 8/2021 |
| CN | 114068887 | A | 2/2022 |
| EP | 3026736 | B1 | 2/2018 |
| EP | 3671915 | A1 | 6/2020 |
| JP | 2009259798 | A | 11/2009 |
| JP | 2018160445 | A | 10/2018 |
| JP | 2019503575 | A | 2/2019 |
| JP | 2021523519 | A | 9/2021 |
| JP | 2022514906 | A | 2/2022 |
| WO | 2009116284 | A1 | 9/2009 |
| WO | 2022137516 | A1 | 6/2022 |

OTHER PUBLICATIONS

European Patent Office, Extended European Search Report Issued in Application No. 23797619.6, May 26, 2025, Germany, 22 pages.

* cited by examiner

ANODE MATERIAL, PREPARATION METHOD THEREOF, AND SECONDARY BATTERY

CROSS REFERENCE TO RELATED APPLICATIONS

The present application is a National Stage of International Application No. PCT/CN2023/099090, filed on Jun. 8, 2023, which claims the benefit of priority of Chinese patent application No. 202211199579X filed with the China Patent Office on Sep. 29, 2022, entitled "ANODE MATERIAL, PREPARATION METHOD THEREOF AND SECONDARY BATTERY", the contents of which are hereby incorporated by reference in its entirety.

TECHNICAL FIELD

The present application relates to the technical field of anode material, in particular to an anode material, a preparation method thereof, and a secondary battery.

BACKGROUND

Recently, the demand for high energy density anode material has been increasing with the development of the market, especially in the field of electric vehicle. At present, the commercially available negative material is graphite whose capacity has been close to the theoretical upper limit, thus the further improvement on the capacity is restricted. Therefore, it is urgent to develop a new generation of anode material with high energy density.

Silicon anode is the next generation of anode material of battery, which has the advantages of high capacity, rich sources and relative safety. However, there is a severe volume expansion effect during cycle of the silicon anode, which leads to pulverization and crushing of the material, and finally resulting in a rapid decline in cycle of battery. There are many solutions in the prior art to solve this problem, including structure design of silicon, such as make improvements by nano-sizing, porous-forming, composite coating. However, the existing structure and technology for suppressing volume expansion of anode material are complicated, and the effect for suppressing volume expansion is limited with increase of capacity of battery.

Therefore, there is an urgent need to further reduce the volume expansion effect of anode material.

SUMMARY

The purpose of the present application is to provide an anode material, a preparation method thereof, and a secondary battery. A Cell comprising the anode material of the present application can increase capacity and cycle stability, while suppressing volume expansion.

In order to achieve the above purpose, in a first aspect, an embodiment of the present application provides an anode material, the anode material includes a secondary particle, the secondary particle includes aggregated primary particles, and the primary particle and the secondary particle satisfy following relationships:

$$10 \le D2_{50}/D1_{max} \le 40 \quad \text{(I)}$$

$$D2_{min}/D2_{50} \ge 0.08 \quad \text{(II)}$$

$$D2_{50}/D2_{max} \ge 0.24 \quad \text{(III)}$$

in Formulas (I), (II) and (III), $D1_{max}$ represents a maximum particle size of the primary particle, $D2_{50}$ represents a median particle size of the secondary particle, $D2_{min}$ represents a minimum particle size of the secondary particle, and $D2_{max}$ represents a maximum particle size of the secondary particle.

In a possible embodiment, the primary particle includes at least one of Li, $SiO_x$ ($0<x<2$), Na, K, Sn, Ge, Si, Fe, Mg, Ti, Zn, Al, P, and Cu.

In a possible embodiment, the primary particle has a volume density of less than or equal to 0.7 g/cm$^3$.

In a possible embodiment, the primary particle has a median particle size $D1_{50}$ of less than or equal to 0.2 μm.

In a possible embodiment, the secondary particle has a median particle size $D2_{50}$ ranging from 0.5 μm to 20 μm.

In a possible embodiment, the primary particle has a maximum particle size $D1_{max}$ ranging from 0.1 μm to 0.4 μm.

In a possible embodiment, the secondary particle has a minimum particle size $D2_{min}$ ranging from 0.5 μm to 4 μm.

In a possible embodiment, the secondary particle has a maximum particle size $D2_{max}$ ranging from 6 μm to 20 μm.

In a possible embodiment, the anode material has a specific surface area of less than or equal to 10 m$^2$/g.

In a possible embodiment, the anode material has a porosity of less than or equal to 10%.

In a possible embodiment, the anode material has a sphericity of more than or equal to 0.7.

In a possible embodiment, the anode material further includes a coating layer on at least part of surfaces of the primary particle and/or the secondary particle.

In a possible embodiment, a material of the coating layer includes at least one of carbon material, graphene, silicon carbide, metal oxide, and nitride.

In a possible embodiment, a material of the coating layer includes carbon material, where the carbon material includes at least one of soft carbon, hard carbon, crystalline carbon, and amorphous carbon.

In a possible embodiment, a material of the coating layer includes metal oxide, where the metal oxide includes at least one of titanium oxide, aluminum oxide, lithium oxide, cobalt oxide, and vanadium oxide.

In a possible embodiment, a material of the coating layer includes nitride, where the nitride includes at least one of titanium nitride, vanadium nitride, cobalt nitride, nickel nitride, and carbon nitride.

In a possible embodiment, the coating layer has a thickness of 1 nm to 500 nm.

In a second aspect, an embodiment of the present application provides a preparation method of an anode material, including:

- granulating a mixture containing a primary particle and a binder to obtain a precursor;
- performing a heat treatment on the precursor to carbonize the binder to obtain a heat-treated product; and
- pulverizing the heat-treated product and classifying so that a secondary particle obtained by the classifying and the primary particle satisfy following relationship:

$$10 \le D2_{50}/D1_{max} \le 40 \quad \text{(I)}$$

$$D2_{min}/D2_{50} \ge 0.08 \quad \text{(II)}$$

$$D2_{50}/D2_{max} \ge 0.24, \quad \text{(III)}$$

to obtain the anode material, in Formulas (I), (II) and (III), $D1_{max}$ represents a maximum particle size of the primary particle, $D2_{50}$ represents a median particle size of the secondary particle, $D2_{min}$ represents a minimum particle size of the secondary particle, and $D2_{max}$ represents a maximum particle size of the secondary particle.

In a possible embodiment, the primary particle has a median particle size of less than or equal to 0.2 μm.

In a possible embodiment, the primary particle includes at least one of Li, $SiO_x$ (0<x<2), Na, K, Sn, Ge, Si, Fe, Mg, Ti, Zn, Al, P, and Cu.

In a possible embodiment, the binder includes at least one of starch, cellulose, tannin, arabic gum, sodium alginate, styrene-butadiene rubber, butyl rubber, cellulose ester, vinyl polymer, polyamide, polyacrylate, epoxy resin, phenolic resin, furan resin, unsaturated polyester, acrylic resin, and polyimide.

In a possible embodiment, a mass ratio of the primary particle and the binder is 100: (5-55).

In a possible embodiment, the mixture containing a primary particle and a binder further includes a solvent.

In a possible embodiment, the solvent includes at least one of phenol, alcohol solvent, ether solvent, and alkane solvent.

In a possible embodiment, a mass ratio of the solvent and the primary particle is 100: (5-40).

In a possible embodiment, before the step of granulating a mixture containing a primary particle and a binder, the preparation method further includes: performing dispersion treatment on the mixture containing a primary particle and a binder.

In a possible embodiment, the dispersion treatment includes at least one of magnetic stirring, mechanical stirring, grinding dispersion, and ultrasonic dispersion.

In a possible embodiment, the heat treatment has a temperature of 500° C. to 1000° C.

In a possible embodiment, the heat treatment has a holding time of 30 min to 900 min.

In a possible embodiment, the heat treatment is performed under a protective atmosphere, where the protective atmosphere includes at least one of nitrogen, argon, and helium.

In a possible embodiment, a material obtained by the pulverizing has a median particle size of 0.5 μm to 15 μm.

In a possible embodiment, a material obtained by the pulverizing has a maximum particle size of 5 μm to 45 μm.

In a possible embodiment, after the classifying, the preparation method further includes: removing particles with a particle size of less than or equal to 0.5 μm from a material obtained by the classifying.

In a possible embodiment, before the step of performing a heat treatment on the precursor to carbonize the binder, the preparation method further includes: pre-pulverizing and pre-classifying the precursor.

In a possible embodiment, the pre-pulverizing includes at least one of mechanical pulverization, jet pulverization, ultrafine pulverization, wet pulverization, compression pulverization, and splitting pulverization.

In a possible embodiment, a material obtained by the pre-pulverizing has a median particle size of 0.5 μm to 20 μm.

In a possible embodiment, a material obtained by the pre-pulverizing has a maximum particle size of 5 μm to 45 μm.

In a possible embodiment, a material obtained by the pre-classifying has a particle size of more than 0.5 μm.

In a possible embodiment, before the step of performing a heat treatment on the precursor to carbonize the binder, the preparation method further includes: performing a fusion treatment on the precursor with a coating material.

In a possible embodiment, the coating material includes at least one of carbon source, graphene, silicon carbide, metal oxide, and nitride.

In a possible embodiment, the coating material includes carbon source, where the carbon source includes at least one of soft carbon, hard carbon, crystalline carbon, and amorphous carbon.

In a possible embodiment, the coating material includes metal oxide, where the metal oxide includes at least one of titanium oxide, aluminum oxide, lithium oxide, cobalt oxide, and vanadium oxide.

In a possible embodiment, the coating material includes nitride, where the nitride includes at least one of titanium nitride, vanadium nitride, cobalt nitride, nickel nitride, and carbon nitride.

In a possible embodiment, an equipment for the fusion treatment includes at least one of a mechanical fusion machine, a fusion mixer, and a convection fusion machine.

In a possible embodiment, the fusion treatment has a duration of 30 min to 150 min.

In a third aspect, the present application provides a secondary battery, the secondary battery includes the anode material as described in the first aspect or the anode material prepared by the preparation method as described in the second aspect.

Compared with the prior art, the present application involves at least the following beneficial effects:

In the anode material provided by the application, by defining relationship of particle sizes between the primary particle and the secondary particle, the primary particles in the secondary particle are stacked tightly, which can avoid too small adhesion among the primary particles due to excessive particle size, such that a phenomenon of cracking and pulverization of the secondary particle formed by aggregation during charging and discharging can be reduced, and at the same time an oversized secondary particle formed by excessive aggregation of the primary particles due to an undersized primary particle can also be avoided. By controlling relationship of particle size between the primary particle and the secondary particle, structure stability of the anode material is enhanced, and small and large sized secondary particles are effectively reduced, thereby particle size distribution of the secondary particle is concentrated, which improve cycling stability and capacity of the anode material, and at the same time reduce volume expansion effect of the anode material.

BRIEF DESCRIPTION OF DRAWINGS

In order to more clearly illustrate the embodiments of the present application or the technical solutions of the prior art, the accompanying drawings needed in the description of the embodiments or the prior art will be briefly introduced below. Obviously, the accompanying drawings in the description below are only some embodiments of the present application, and other accompanying drawings can also be obtained for those of ordinary skill in the art according to the accompanying drawings without paying creative efforts.

DESCRIPTION OF EMBODIMENTS

Figure 1:
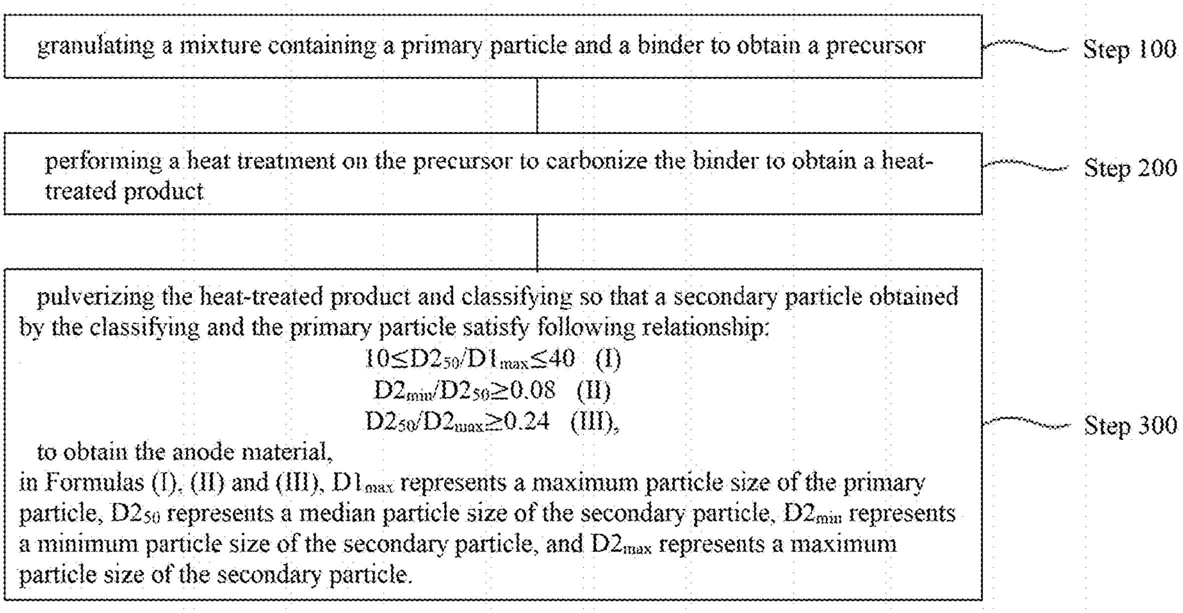
FIG. 1 is a schematic flow chart of a preparation method of the anode material of the present application.

The present application will be described in further detail below with reference to the accompanying drawings, in order to provide a better understanding of the technical solutions of the present application.

It should be clear that, the following described embodiments are merely part examples of the present application, but not all of the examples. On the basis of the embodiments of the present application, all other embodiments obtained by the ordinary technician in the field without making any creative labor belong to the scope of protection of the present application.

The terms "first" and "second" are merely intended for a purpose of description, and shall not be understood as an indication or implication of relative importance or implicit indication of the number of indicated technical features. Therefore, a feature limited by "first" or "second" may explicitly indicate or implicitly include one or more such features.

In order to understand the present application more easily, the specific term is properly defined in the present application. Unless otherwise defined herein, the scientific terms and technical terms used in the present application have the meanings commonly understood by those skilled in the art to which the present application belongs.

As used herein, the term "primary particle" refers to single particle that do not aggregate or a particle unit for forming a secondary particle.

The present application provides an anode material, the anode material includes a secondary particle, the secondary particle includes aggregated primary particles, and the primary particle and the secondary particle satisfy following relationships:

$$10 \le D2_{50}/D1_{max} \le 40 \quad \text{(I)}$$

$$D2_{min}/D2_{50} \ge 0.08 \quad \text{(II)}$$

$$D2_{50}/D2_{max} \ge 0.24 \quad \text{(III)}$$

in Formulas (I), (II) and (III), $D1_{max}$ represents a maximum particle size of the primary particle, $D2_{50}$ represents a median particle size of the secondary particle, $D2_{min}$ represents a minimum particle size of the secondary particle, and $D2_{max}$ represents a maximum particle size of the secondary particle.

In general, it is easy for primary particles to voluntarily agglomerate to form a secondary particle, which results to have a wide range of particle size distribution and a loose structure for the secondary particle. However, in the anode material provided by the application, by defining relationship of particle sizes between the primary particle and the secondary particle, the primary particle in the secondary particle are stacked tightly, which can avoid small adhesion among the primary particles due to excessive particle size, such that a phenomenon of cracking and pulverization of the secondary particle formed by aggregation during charging and discharging can be reduced, and at the same time an oversized secondary particle formed by excessive aggregation of the primary particles due to an undersized primary particle can also be avoided. By controlling relationship of particle size between the primary particle and the secondary particle, structure stability of the anode material is enhanced, and small and large sized secondary particles are effectively reduced, thereby particle size distribution of the secondary particle is concentrated, which improve cycling stability and capacity of the anode material, and at the same time reduce volume expansion effect of the anode material.

In the present application, $10 \le D2_{50}/D1_{max} \le 40$, specifically, $D2_{50}/D1_{max}$ can be 10, 15, 20, 25, 30, 35, 40, etc., or other value within the above range, which is not limited herein. When in the above range, it indicates that the primary particle and the secondary particle have appropriate particle sizes and a high matching degree with each other. The primary particles in the secondary particle are stacked tightly, thus the particles in the anode material are not easily pulverized, and stress caused by expansion during charging and discharging can be well released, thereby improving cycling performance of the material and suppressing expansion. When the maximum particle size $D1_{max}$ of the primary particle is excessively large, adhesion among the particles is small and pulverization is easily occurred, resulting in a reduced cycling performance. While when the maximum particle size $D1_{max}$ of the primary particle is excessively small, interaction among the particles is increased, thus adhesion among them is enhanced, resulting in forming easily an oversized secondary particle. It is difficult for the oversized secondary particle to release stress caused by expansion during charging and discharging, resulting in the secondary particles to fall off current collector or current collector to be destroyed, thereby reducing performance of the material.

$D2_{min}/D2_{50} > 0.08$, specifically, $D2_{min}/D2_{50}$ can be 0.08, 0.1, 0.2, 0.3, 0.4, 0.5, 0.6, 0.7, etc., or other value within the above range, which is not limited herein. When in the above range, it indicates that amount of fine powder in the secondary particle is less, content distribution of an active component in the material is uniform, and particle size distribution the secondary particle is concentrated, which can reduce expansion difference among the secondary particles, thus the structure stability of the material is improved.

$D2_{50}/D2_{max} \ge 0.24$, specifically, $D2_{50}/D2_{max}$ can be 0.24, 0.28, 0.3, 0.4, 0.5, 0.6, 0.7, 0.8, etc., or other value within the above range, which is not limited herein. When in the above range, it indicates that particle size distribution of the secondary particle is concentrated, secondary particles with large particle size are less, thus volume expansion of the material is reduced effectively and cycling performance of the material is improved.

In some embodiments, the primary particle includes at least one of Li, $SiO_x$ (0<x<2), Na, K, Sn, Ge, Si, Fe, Mg, Ti, Zn, Al, P, and Cu.

In some embodiments, the primary particle includes $SiO_x$ (0<x<2), which specifically can be $SiO_{0.1}$, $SiO_{0.3}$, $SiO_{0.5}$, $SiO_{0.7}$, $SiO_{0.8}$, $SiO_1$, $SiO_{1.2}$, $SiO_{1.5}$, $SiO_{1.8}$, $SiO_{1.9}$, etc., or other value within the above range, which is not limited herein.

In some embodiments, the primary particle has a sphericity of more than 0.7. Preferably, the primary particle has a sphericity of more than 0.9.

In some embodiments, the primary particle has a volume density of less than or equal to 0.7 g/cm$^3$. Specifically, the primary particle can have a volume density of 0.7 g/cm$^3$, 0.6 g/cm$^3$, 0.5 g/cm$^3$, 0.4 g/cm$^3$, 0.3 g/cm$^3$, 0.2 g/cm$^3$, 0.1 g/cm$^3$, etc., or other value within the above range, which is not limited herein. Preferably, the primary particle has a volume density of less than or equal to 0.4 g/cm$^3$. More preferably, the primary particle has a volume density of less than or equal to 0.2 g/cm$^3$.

In some embodiments, the primary particle has a median particle size of less than or equal to 0.2 μm, which specifically, can be 1 nm, 5 nm, 10 nm, 20 nm, 30 nm, 40 nm, 60 nm, 80 nm, 100 nm, 130 nm, 150 nm, 200 nm, etc., or other value within the above range, which is not limited herein. Preferably, the primary particle has a median particle size of 5 nm to 200 nm. More preferably, the primary particle has a median particle size of 10 nm to 200 nm.

In some embodiments, the primary particle has a maximum particle size $D1_{max}$ ranging from 0.1 μm to 0.4 μm. Specifically, $D1_{max}$ can be 0.1 μm, 0.20 μm, 0.3 μm, 0.4 μm, etc., or other value within the above range, which is not limited herein. When the maximum particle size $D1_{max}$ of the primary particle is controlled within the above range, the primary particle of the present application has a small particle size, and particle is not easily pulverized, thus stability of the anode material can be improved.

In some embodiments, the secondary particle has a minimum particle size $D2_{min}$ ranging from 0.5 μm to 4 μm. Specifically, $D2_{min}$ can be 0.5 μm, 1 μm, 2 μm, 3 μm, 4 μm, etc., or other value within the above range, which is not limited herein. When $D2_{min}$ is controlled within the above range, amount of fine powder in the anode material is less, which facilitates for the anode material to obtain an advantage of long cycling.

In some embodiments, the secondary particle has a maximum particle size $D2_{max}$ ranging from 6 μm to 20 μm. Specifically, $D2_{max}$ can be 6 μm, 8 μm, 10 μm, 12 μm, 15 μm, 18 μm, 20 μm, etc., or other value within the above range, which is not limited herein. When $D2_{max}$ is controlled within the above range, expansion of the material can be effectively limited, which facilitates to improve performance of the material.

In some embodiments, $D2_{50}$ ranges from 0.5 μm to 20 μm. Specifically, $D2_{50}$ can be 0.5 μm, 1 μm, 3 μm, 5 μm, 8 μm, 10 μm, 13 μm, 17 μm, 19 μm, 20 μm, etc., or other value within the above range, which is not limited herein. When $D2_{50}$ is controlled within the above range, average particle size of the obtained anode material in a whole is small, which facilitates to reduce volume expansion of the anode material. Preferably, $D2_{50}$ ranges from 0.8 μm to 12 μm. More preferably, $D2_{50}$ ranges from 1 μm to 8 μm.

In some embodiments, the anode material has a specific surface area of less than or equal to 10 $m^2/g$. Specifically, the anode material can have a specific surface area of 10 $m^2/g$, 9 $m^2/g$, 8 $m^2/g$, 7 $m^2/g$, 6 $m^2/g$, 5 $m^2/g$, 3 $m^2/g$, etc., or other value within the above range, which is not limited herein.

In some embodiments, the anode material has a porosity of less than or equal to 10%, which specifically can be 10%, 9%, 8%, 7%, 6%, 5%, 4%, 2.5%, 2%, 1%, etc., or other value within the above range, which is not limited herein. When the porosity of the anode material is controlled within the above range, it is not easy for electrolyte to penetrate into the material, which facilitates to improve stability of the anode material. Preferably, the anode material has a porosity of less than or equal to 5%. More preferably, the anode material has a porosity of less than or equal to 2.5%.

In some embodiments, the primary particle has a sphericity of more than or equal to 0.7. Specifically, the primary particles can has a sphericity of 0.7, 0.8, 0.9, etc. When the sphericity is within the above range, it facilitates to improve processability of the material.

In some embodiments, the anode material further includes a coating layer on at least part of surfaces of the primary particle and/or the secondary particle. Preferably, there is a coating layer on the surface of the primary particle, and there is also a coating layer on the surface of the secondary particle, materials of the two coating layer can be the same or different.

In some embodiments, a material of the coating layer includes at least one of carbon material, graphene, silicon carbide, metal oxide, and nitride.

In some embodiments, when the material of the coating layer is carbon material, the secondary particle can be dispersedly embedded in the carbon material. In other words, the secondary particle is dispersed in the carbon material to form a silicon-carbon composite material. The carbon material constructs a conductive network for the secondary particle, which facilitates to liberate capacity of the anode material. And, existence of the carbon material can buffer volume expansion of the particle and improve cycling stability.

In some embodiments, a carbon coating layer is formed on surface of the primary particle, and the primary particles with the carbon coating layer aggregate to form the secondary particle, which facilitates to improve cycling stability of the anode material.

In some embodiments, the carbon material includes at least one of soft carbon, hard carbon, crystalline carbon, and amorphous carbon.

In a possible embodiment, the metal oxide includes at least one of titanium oxide, aluminum oxide, lithium oxide, cobalt oxide, and vanadium oxide.

In a possible embodiment, the nitride includes at least one of titanium nitride, vanadium nitride, cobalt nitride, nickel nitride, and carbon nitride.

In some embodiments, the coating layer has a thickness of 1 nm to 500 nm. Specifically, the coating layer can have a thickness of 1 nm, 5 nm, 10 nm, 30 nm, 50 nm, 80 nm, 100 nm, 200 nm, 300 nm, 400 nm, 500 nm, etc., or other value within the above range, which is not limited herein.

The present application also provides a preparation method of the above anode material, as shown in FIG. 1, including:

granulating a mixture containing a primary particle and a binder to obtain a precursor;

performing a heat treatment on the precursor to carbonize the binder to obtain a heat-treated product; and pulverizing the heat-treated product and classifying so that a secondary particle obtained by the classifying and the primary particle satisfy following relationship:

$$10 \le D2_{50}/D1_{max} \le 40 \quad \text{(I)}$$

$$D2_{min}/D2_{50} \ge 0.08 \quad \text{(II)}$$

$$D2_{50}/D2_{max} \ge 0.24, \quad \text{(III)}$$

to obtain the anode material, in Formulas (I), (II) and (III), $D1_{max}$ represents a maximum particle size of the primary particle, $D2_{50}$ represents a median particle size of the secondary particle, $D2_{min}$ represents a minimum particle size of the secondary particle, and $D2_{max}$ represents a maximum particle size of the secondary particle.

In the above solution, the present application prepares the secondary particle by applying the mixture of the primary particle and a binder as a raw material and following by performing a heat treatment and crushing and classifying, such that the secondary particle has a relatively concentrated particle size distribution and a moderate particle size, thus in the present application, the primary particle and the secondary particle have a good matching degree with each other, thereby reducing volume expansion of the anode material, and improving structure stability and cycling performance of the anode material.

The preparation method of the present application is specifically introduced as follows.

Step 100: granulating a mixture containing a primary particle and a binder to obtain a precursor.

In some embodiments, the primary particle has a median particle size of less than or equal to 0.2 μm, which specifically can be 1 nm, 5 nm, 10 nm, 20 nm, 30 nm, 40 nm, 60 nm, 80 nm, 100 nm, 130 nm, 150 nm, 200 nm, etc., or other value within the above range, which is not limited herein. Preferably, the primary particle has a median particle size of 5 nm to 200 nm. More preferably, the primary particle has a median particle size of 10 nm to 200 nm. At present, most of anode materials of secondary batteries are obtained by assembling/constructing primary particles into secondary particles by specific means and methods. During this process, morphological parameters and sizes of the primary particle and the secondary particle are very important, which determine basic properties of the anode material. In the present application, by screening the primary particles with suitable size (specifically selecting raw material with a median particle size of less than 0.2 μm), the raw material has similar particle size, and further by constructing the secondary particle by applying the primary particle having similar particle size, the primary particle and the secondary particle have a good matching degree with each other, thus electrochemical performance of the anode material is improved. If the prepared secondary particle has an excessively large particle size, the material becomes loose, unstable in structure, and easy to collapse and expand; while if the prepared secondary particle has an excessively small particle size, a tap density of the material is reduced, which does not facilitate to improve energy density of the material. In addition, excessively small particle size results to increase specific surface area of the material, which decreases initial efficiency of the material.

In some embodiments, the mixture containing a primary particle and a binder further includes a solvent, where the solvent includes at least one of phenol, alcohol solvent, ether solvent, and alkane solvent. The alcohol solvent can be, for example, ethanol, ethylene glycol, and glycerol, etc. The ether solvent can be, for example, diethyl ether. The alkane solvent can be, for example, n-hexane, toluene, and xylene, etc.

In some embodiments, a mass ratio of the solvent and the primary particle is 100: (5-40). Specifically, the mass ratio of the solvent and the primary particles is 100:0.5, 100:10, 100:20, 100:30, 100:40, etc., or other value within the above range, which is not limited herein.

In some embodiments, the primary particle includes at least one of Li, $SiO_x$ ($0<x<2$), Na, K, Sn, Ge, Si, Fe, Mg, Ti, Zn, Al, P, and Cu.

In some embodiments, the primary particle includes $SiO_x$ ($0<x<2$), which specifically can be $SiO_{0.1}$, $SiO_{0.3}$, $SiO_{0.5}$, $SiO_{0.7}$, $SiO_{0.8}$, $SiO_1$, $SiO_{1.2}$, $SiO_{1.5}$, $SiO_{1.8}$, $SiO_{1.9}$, etc., or other value within the above range, which is not limited herein.

In some embodiments, the primary particle has a sphericity of more than 0.7. Preferably, the primary particle has a sphericity of more than 0.9. The higher the sphericity of the primary particle, the more stable of its structure during cycling, thus avoiding breakage problem of particle of the material due to repeated formation of SEI film.

In some embodiments, the binder includes at least one of starch, cellulose, tannin, arabic gum, sodium alginate, styrene-butadiene rubber, butyl rubber, cellulose ester, vinyl polymer, polyamide, polyacrylate, epoxy resin, phenolic resin, furan resin, unsaturated polyester, acrylic resin, and polyimide.

In some embodiments, a mass ratio of the primary particle and the binder is 100:(5-55). Specifically, the mass ratio of the primary particle and the binder is 100:5, 100:10, 100:20, 100:30, 100:40, 100:55, etc., or other value within the above range, which is not limited herein.

In some embodiments, before the step of granulating a mixture containing a primary particle and a binder, the preparation method further includes: performing dispersion treatment on the mixture containing a primary particle and a binder. The dispersion treatment of the primary particle and the binder can disperse active substances in the material, avoid aggregation of the active substances, and can disperse the active substances into smaller nanoparticles.

In some embodiments, the dispersion treatment includes at least one of magnetic stirring, mechanical stirring, grinding dispersion, and ultrasonic dispersion.

Step S200: performing a heat treatment on the precursor to carbonize the binder to obtain a heat-treated product.

In some embodiments, before the step of performing a heat treatment on the precursor to carbonize the binder, the preparation method further includes: pre-pulverizing and pre-classifying the precursor.

In some embodiments, before the pre-pulverizing, the mixture containing a primary particle and a binder needs to be dried for further pulverizing treatment.

In some embodiments, the pre-pulverizing includes at least one of mechanical pulverization, jet pulverization, ultrafine pulverization, wet pulverization, compression pulverization, and splitting pulverization.

In some embodiments, a material obtained by the pre-pulverizing has a median particle size of 0.5 μm to 20 μm, which specifically can be 0.5 μm, 1 μm, 2 μm, 5 μm, 8 μm, 10 μm, 12 μm, 15 μm, 20 μm, etc., or other value within the above range, which is not limited herein. Preferably, a material obtained by the pre-pulverizing has a median particle size of 1 μm to 15 μm. More preferably, a material obtained by the pre-pulverizing has a median particle size of 2 μm to 8 μm.

In some embodiments, a material obtained by the pre-pulverizing has a maximum particle size of 5 μm to 45 μm, which specifically can be 5 μm, 10 μm, 15 μm, 20 μm, 25 μm, 30 μm, 35 μm, 40 μm, 45 μm, etc., or other value within the above range, which is not limited herein. Preferably, a material obtained by the pre-pulverizing has a maximum particle size of 5 μm to 35 μm. More preferably, a material obtained by the pre-pulverizing has a maximum particle size of 6 μm to 30 μm.

In the present application, by defining the median particle size and the maximum particle size of the particle obtained by the pre-pulverizing, an uniform particle size after pulverizing is ensured.

In some embodiments, a material obtained by the pre-classifying has a particle size of more than 0.5 μm. That is, through the classifying, particles with a particle size of less than or equal to 0.5 μm are removed to improve uniformity of particle size distribution of active substances in the material.

In some embodiments, before the step of performing a heat treatment on the precursor to carbonize the binder, the preparation method further includes: performing a fusion treatment on the precursor with a coating material. It can be understood that the fusion treatment is performed after the pre-pulverizing and pre-classifying.

In some embodiments, the coating material includes at least one of carbon source, graphene, silicon carbide, metal oxide, and nitride.

In some embodiments, the carbon source includes at least one of sucrose, glucose, polyethylene, polyvinyl alcohol, polyethylene glycol, polyaniline, epoxy resin, phenolic resin, furfural resin, acrylic resin, polyethylene oxide, polyvinylidene fluoride, polyacrylonitrile, polyvinyl chloride, and pitch.

In some embodiments, the coating material includes metal oxide, where the metal oxide includes at least one of titanium oxide, aluminum oxide, lithium oxide, cobalt oxide, and vanadium oxide.

In some embodiments, the coating material includes nitride, where the nitride includes at least one of titanium nitride, vanadium nitride, cobalt nitride, nickel nitride, and carbon nitride.

In some embodiments, an equipment for the fusion treatment includes at least one of a mechanical fusion machine, a fusion mixer, and a convection fusion machine.

In some embodiments, the fusion treatment has a duration of 30 min to 150 min. Specifically, the fusion treatment can have a duration of 30 min, 50 min, 70 min, 90 min, 100 min, 110 min, 130 min, 150 min, etc., or other value within the above range, which is not limited herein.

In some embodiments, the fusion treatment has a blade gap of 0.1 cm to 0.5 cm. Specifically, the fusion treatment can have a blade gap of 0.1 cm, 0.2 cm, 0.3 cm, 0.4 cm, 0.5 cm, etc., or other value within the above range, which is not limited herein.

In some embodiments, the heat treatment has a temperature of 500° C. to 1000° C. Specifically, the heat treatment can have a temperature of 500° C., 600° C., 700° C., 800° C., 900° C., 1000° C., etc., or other value within the above range, which is not limited herein.

In some embodiments, the heat treatment has a holding time of 30 min to 900 min. Specifically, the heat treatment can have a holding time of 30 min, 60 min, 120 min, 360 min, 480 min, 720 min, 800 min, 900 min, etc., or other value within the above range, which is not limited herein.

In some embodiments, the heat treatment is performed under a protective atmosphere, where the protective atmosphere includes at least one of nitrogen, argon, and helium.

Step S300: pulverizing the heat-treated product and classifying so that a secondary particle obtained by the classifying and the primary particle satisfy following relationship:

$$10 \le D2_{50}/D1_{max} \le 40 \quad \text{(I)}$$

$$D2_{min}/D2_{50} \ge 0.08 \quad \text{(II)}$$

$$D2_{50}/D2_{max} \ge 0.24, \quad \text{(III)}$$

to obtain the anode material.

In some embodiments, the pulverizing includes at least one of mechanical pulverization, jet pulverization, ultrafine pulverization, wet pulverization, compression pulverization, and splitting pulverization.

In some embodiments, a material obtained by the pulverizing has a median particle size of 0.5 μm to 15 μm, which specifically can be 0.5 μm, 1 μm, 2 μm, 5 μm, 8 μm, 10 μm, 12 μm, 15 μm, etc., or other value within the above range, which is not limited herein. Preferably, a material obtained by the pulverizing has a median particle size of 1 μm to 13 μm. More preferably, a material obtained by the pulverizing has a median particle size of 2 μm to 10 μm.

In some embodiments, a material obtained by the pulverizing has a maximum particle size of 5 μm to 45 μm, which specifically can be 5 μm, 10 μm, 15 μm, 20 μm, 25 μm, 30 μm, 35 μm, 40 μm, 45 μm, etc., or other value within the above range, which is not limited herein. Preferably, a material obtained by the pulverizing has a maximum particle size of 5 μm to 40 μm. More preferably, a material obtained by the pulverizing has a maximum particle size of 6 μm to 30 μm.

In some embodiments, after the classifying, the preparation method further includes: removing particles with a particle size of less than or equal to 0.5 μm from a material obtained by the classifying. It can be understood that the material with a particle size of less than or equal to 0.5 μm belongs to fine particle, and removing the fine particle can reduce expansion difference among different particles in the material and improve stability of the composite material as used in a secondary battery.

In some embodiments, $10 \le D2_{50}/D1_{max} \le 40$, specifically, $D2_{50}/D1_{max}$ can be 10, 15, 20, 25, 30, 35, 40, etc., or other value within the above range, which is not limited herein. When in the above range, it indicates that the primary particle and the secondary particle have appropriate particle sizes and a high matching degree with each other. The primary particles in the secondary particle are stacked tightly, thus the particles in the anode material are not easily pulverized, and stress caused by expansion during charging and discharging can be well released, thereby improving cycling performance of the material and suppressing expansion. When the maximum particle size $D1_{max}$ of the primary particle is excessively large, adhesion among the particles is small and pulverization is easily occurred, resulting in a reduced cycling performance. While when the maximum particle size $D1_{max}$ of the primary particle is excessively small, interaction among the particles is increased, thus adhesion among them is enhanced, resulting in forming easily an oversized secondary particle. It is difficult for the oversized secondary particle to release stress caused by expansion during charging and discharging, resulting in the secondary particles to fall off current collector or current collector to be destroyed, thereby reducing performance of the anode material.

In some embodiments, specifically, $D2_{min}/D2_{50}$ can be 0.08, 0.1, 0.2, 0.3, 0.4, 0.5, 0.6, 0.7, etc., or other value within the above range, which is not limited herein. When in the above range, it indicates that amount of fine powder in the secondary particle is less, content distribution of an active component in the material is uniform, which can reduce expansion difference among the secondary particles, thus the structure stability of the material is improved.

In some embodiments, $D2_{50}/D2_{max} \ge 0.24$, specifically, $D2_{50}/D2_{max}$ can be 0.24, 0.28, 0.3, 0.4, 0.5, 0.6, 0.7, 0.8, etc., or other value within the above range, which is not limited herein. When in the above range, it indicates that particle size distribution of the secondary particle is concentrated, secondary particles with large particle size are less, thus volume expansion of the material is reduced effectively and cycling performance of the material is improved.

Embodiments of the present application provides a secondary battery, the secondary battery includes the anode material as described by the present application or the anode material prepared by the preparation method as described by the present application.

The embodiments of the present application will be further described with reference to the following several examples. The embodiments can be carried out with appropriately changes within the scope of unchangeable main rights.

Example 1

(1) nano-silicon particles were screened by bulk density tester and Malvern particle size analyzer to obtain a nano-silicon with a median particle size $D1_{50}$ of 50 nm, $D1_{max}$ of 155 nm and a bulk density of 0.29 g/cm$^3$;
(2) the nano-silicon obtained in step (1) and polyvinyl alcohol with a mass ratio of 100:28 were placed in phenol, and then ball milled in a planetary ball mill for 2 hours, and dried by rotary evaporation at 120° C. to obtain a first precursor;
(3) the first precursor was pre-pulverized and pre-classified to obtain a second precursor with a median particle size of 7.1 μm and a maximum particle size of 23.8 μm;
(4) the second precursor and phenolic resin were mixed in a mass ratio of 50:35, and then performed a fusion treatment for 40 min, where the blade gap was 0.1 cm. Then, the fused material was placed in a high-temperature box furnace, nitrogen was fed, and heat treatment was carried out at 820° C. for 4 hours; and
(5) the material obtained in step (4) was pulverized and classified to obtain an anode material.

The anode material prepared by this Example includes carbon material and secondary particles dispersed in the carbon material, where the secondary particle include aggregated primary particles, there is a coating layer of carbon material on surface of the primary particle, and the primary particle includes a nano-silicon particle. The anode material has a median particle diameter $D2_{50}$ of 3.6 μm, a minimum particle size $D2_{min}$ of 0.6 μm, a maximum particle size $D2_{max}$ of 10.8 μm, and a sphericity of 0.89.

Figure 2:
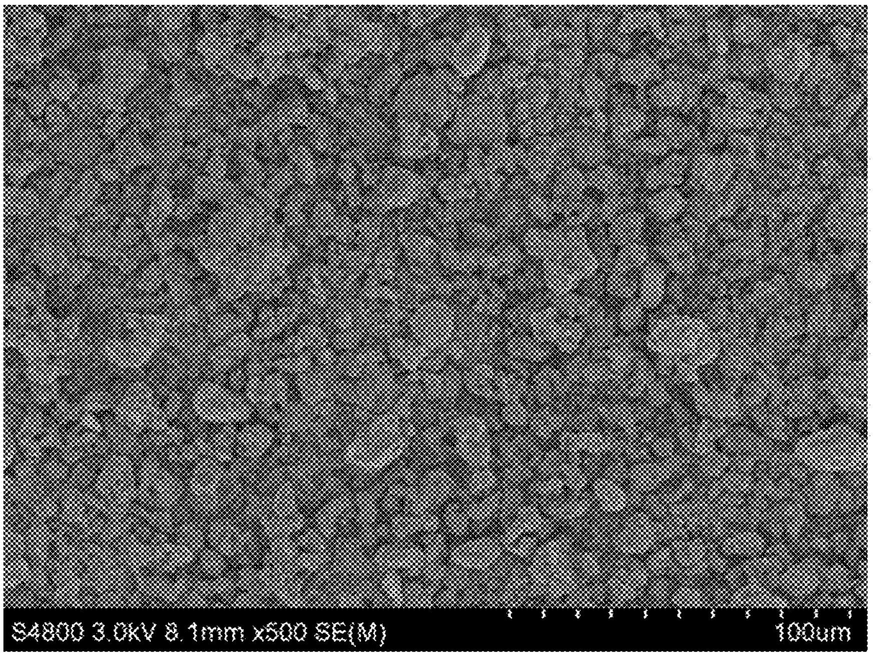
FIG. 2 is a scanning electron microscope (SEM) image of the anode material prepared by Example 1 of the present application.

FIG. 2 shows a SEM image of the anode material prepared by Example 1 of the present application. It can be clearly seen that the particle size distribution of the secondary particles is uniform.

Figure 3:
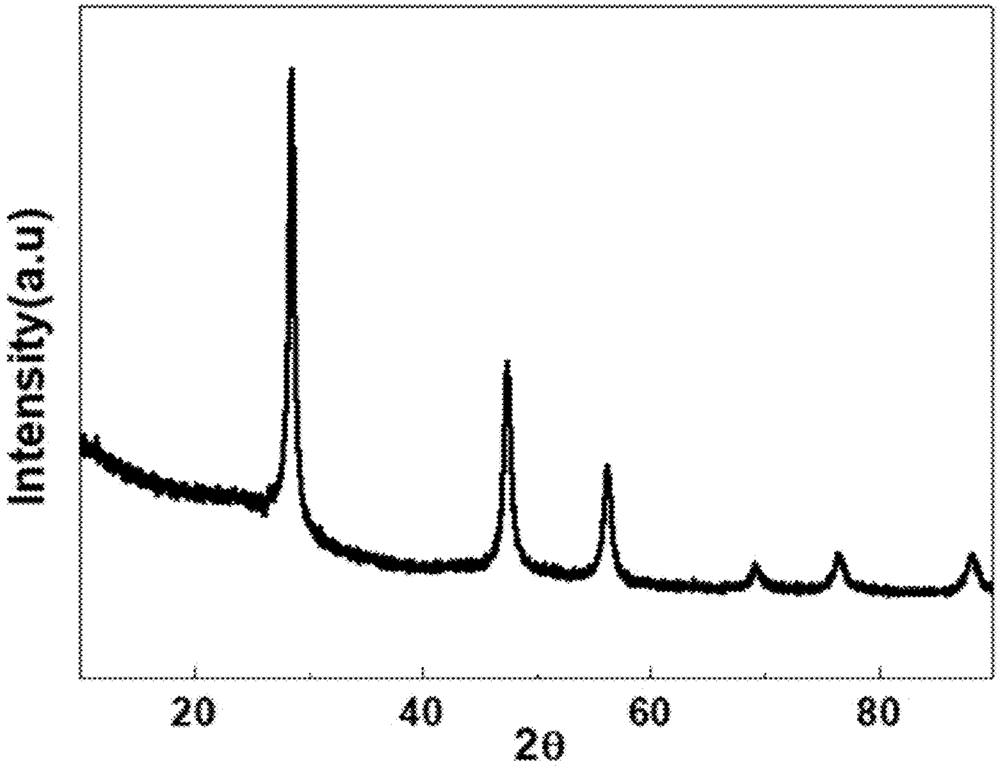
FIG. 3 is a XRD image of the anode material prepared by Example 1 of the present application.

FIG. 3 shows a XRD image of the anode material prepared by Example 1 of the present application. It can be clearly seen that the final product involves a peak position of silicon peak.

Figure 4:
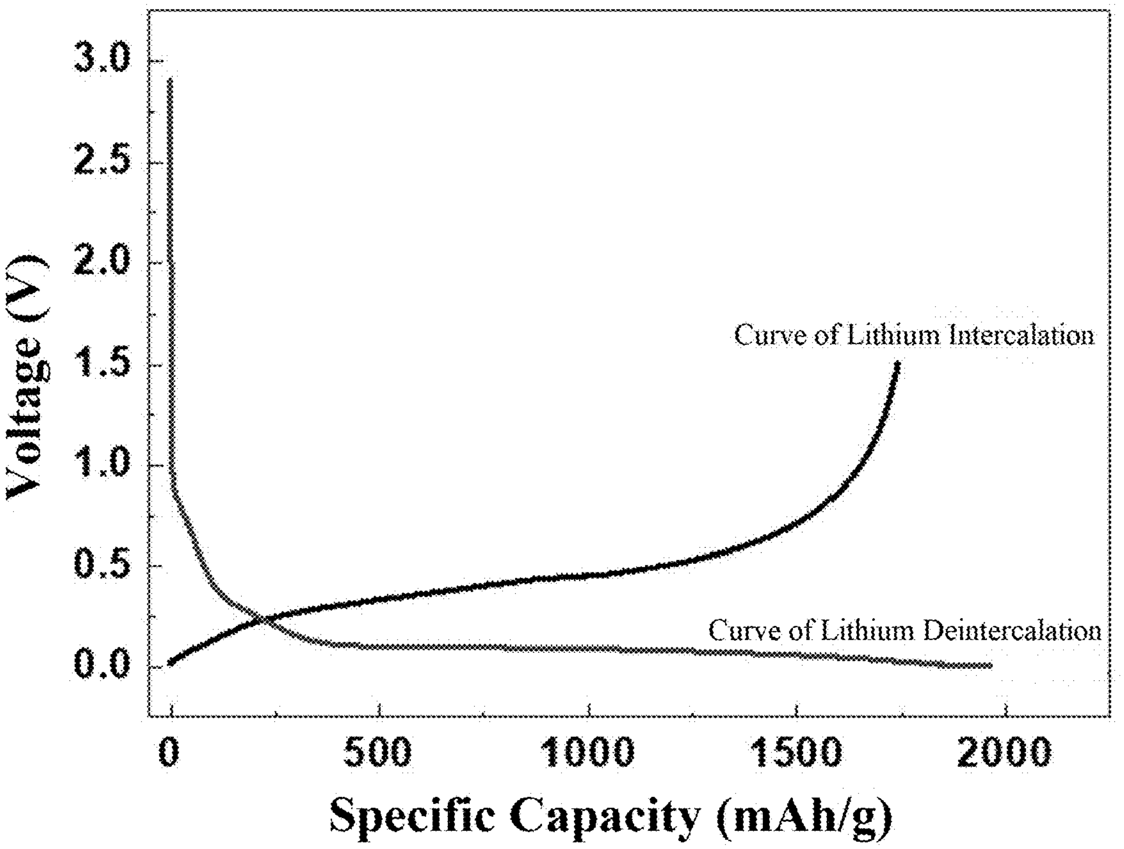
FIG. 4 is the initial charge-discharge curve of the anode material prepared by Example 1 of the present application.

FIG. 4 shows the initial charge-discharge curve of the anode material prepared by Example 1 of the present application. It can be clearly seen that both the initial charge-discharge capacity and the initial efficiency of the anode material are high.

Figure 5:
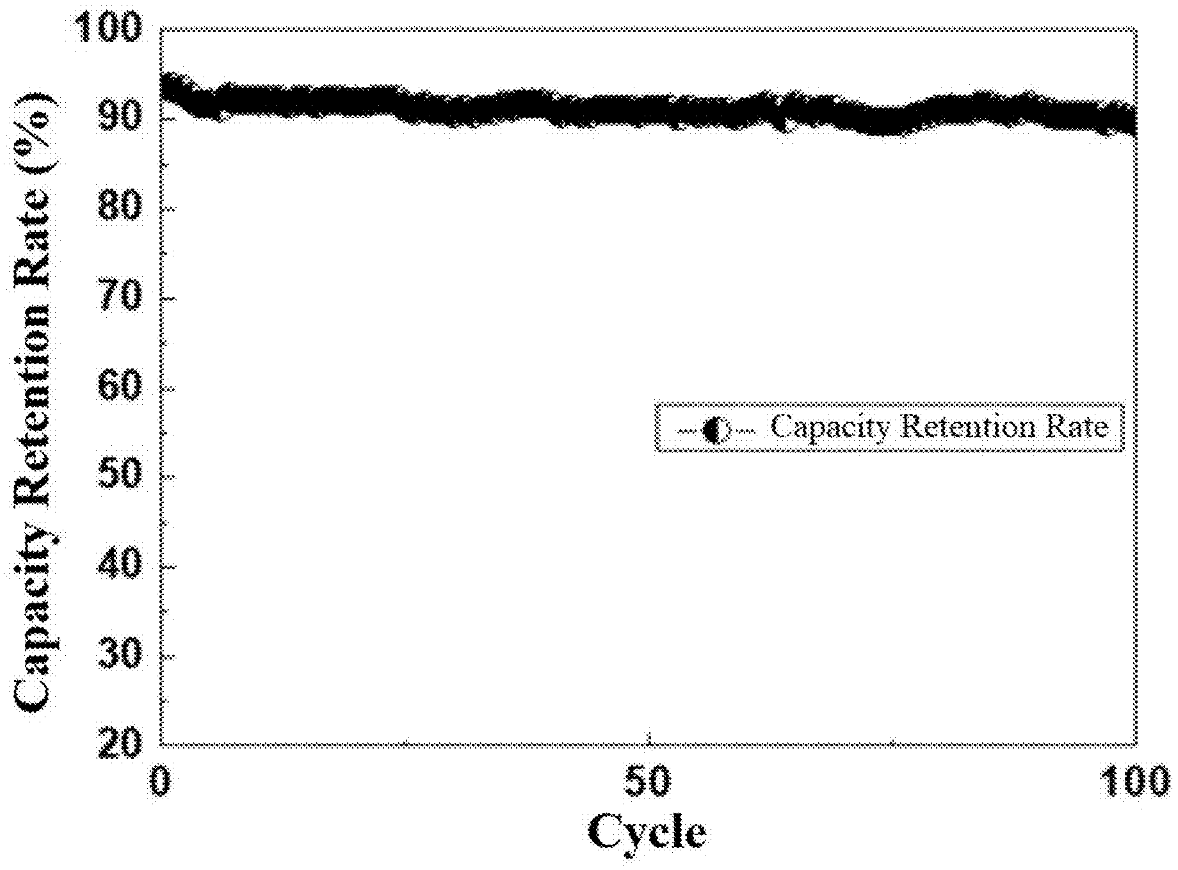
FIG. 5 is a cycling performance curve of the anode material prepared by Example 1 of the present application.

FIG. 5 shows a cycling performance curve of the anode material prepared by Example 1 of the present application. It can be clearly seen that the anode material has an excellent cycling performance, and the capacity retention rate is 93.1% after 100 cycles.

Example 2

(1) nano-silicon particles were screened by bulk density tester and Malvern particle size analyzer to obtain a nano-silicon with a median particle size $D1_{50}$ of 20 nm, $D1_{max}$ of 103 nm and a bulk density of 0.39 g/cm$^3$;
(2) the nano-silicon obtained in step (1) and fructose with a mass ratio of 100:48 were placed in ethylene glycol, and then ball milled in a planetary ball mill for 62 hours, and dried by rotary evaporation at 150° C. to obtain a first precursor;
(3) the first precursor was pulverized pre-pulverized and pre-classified to obtain a second precursor with a median particle size of 3.5 μm and a maximum particle size of 10.8 μm;
(4) the second precursor and glucose were mixed in a mass ratio of 50:35, and then performed a fusion treatment for 30 min, where the blade gap was 0.15 cm. Then, the fused material was placed in a high-temperature box furnace, nitrogen was fed, and heat treatment was carried out at 820° C. for 4 hours; and
(5) the material obtained in step (4) was pulverized and classified to obtain an anode material.

The anode material prepared by this Example includes carbon material and secondary particles dispersed in the carbon material, where the secondary particle include aggregated primary particles, there is a coating layer of carbon material on surface of the primary particle, and the primary particle includes a nano-silicon particle. The anode material has a median particle diameter $D2_{50}$ of 1.8 μm, a minimum particle size $D2_{min}$ of 0.32 μm, a maximum particle size $D2_{max}$ of 5.8 μm, and a sphericity of 0.83.

Example 3

(1) nano-silicon particles were screened by bulk density tester and Malvern particle size analyzer to obtain a nano-silicon with a median particle size $D1_{50}$ of 20 nm, $D1_{max}$ of 111 nm and a bulk density of 0.14 g/cm$^3$;
(2) the nano-silicon obtained in step (1) and fructose with a mass ratio of 100:58 were placed in ethylene glycol, and then ball milled in a planetary ball mill for 9 hours, and dried by rotary evaporation at 150° C. to obtain a first precursor;
(3) the first precursor was pulverized pre-pulverized and pre-classified to obtain a second precursor with a median particle size of 8.3 μm, and a maximum particle size of 16.8 μm;
(4) the second precursor and pitch were mixed in a mass ratio of 45:35, and then performed a fusion treatment for 60 min, where the blade gap was 0.15 cm. Then, the fused material was placed in a high-temperature box furnace, nitrogen was fed, and heat treatment was carried out at 920° C. for 4 hours; and
(5) the material obtained in step (4) was pulverized and classified to obtain an anode material.

The anode material prepared by this Example includes carbon material and secondary particles dispersed in the carbon material, where the secondary particle include aggregated primary particles, there is a coating layer of carbon material on surface of the primary particle, and the primary particle includes a nano-silicon particle. The anode material has a median particle diameter $D2_{50}$ of 4.3 μm, a minimum particle size $D2_{min}$ of 0.78 μm, a maximum particle size $D2_{max}$ of 14.5 μm, and a sphericity of the anode material of 0.92.

Example 4

(1) nano-silicon particles were screened by bulk density tester and Malvern particle size analyzer to obtain a nano-silicon with a median particle size $D1_{50}$ of 100 nm, $D1_{max}$ of 249 nm and a bulk density of 0.59 g/cm$^3$;
(2) the nano-silicon obtained in step (1) and pitch with a mass ratio of 90:48 were placed in butanol, and then ball milled in a planetary ball mill for 4 hours, and dried by rotary evaporation at 150° C. to obtain a first precursor;

(3) the first precursor was pulverized pre-pulverized and pre-classified to obtain a second precursor with a median particle size of 11.3 μm, and a maximum particle size of 20.7 μm;

(4) the second precursor and graphene were mixed in a mass ratio of 40:25, and then performed a fusion treatment for 20 min, where the blade gap was 0.25 cm. Then, the fused material was placed in a high-temperature box furnace, nitrogen was fed, and heat treatment was carried out at 950° C. for 6 hours; and (5) the material obtained in step (4) was pulverized and classified to obtain an anode material.

The anode material prepared by this Example includes a secondary particle and graphene layer on surface of the secondary particle, where the secondary particle includes aggregated primary particles, there is a coating layer of carbon material on surface of the primary particle, and the primary particle includes a nano-silicon particle. The anode material has a median particle diameter $D2_{50}$ of 8.2 μm, a minimum particle size $D2_{min}$ of 1.08 μm, a maximum particle size $D2_{max}$ of 16.5 μm, and a sphericity of 0.95.

Example 5

(1) nano-silicon particles were screened by bulk density tester and Malvern particle size analyzer to obtain a nano-silicon with a median particle size $D1_{50}$ of 30 nm, $D1_{max}$ of 115 nm and a bulk density of 0.25 g/cm$^3$;

(2) the nano-silicon obtained in step (1) and pitch with a mass ratio of 90:48 were placed in isopropanol, and then ball milled in a planetary ball mill for 4 hours, and freeze drying at −40° C. to obtain a first precursor;

(3) the first precursor was pulverized pre-pulverized and pre-classified to obtain a second precursor with a median particle size of 5.9 μm, and a maximum particle size of 15 μm;

(4) the second precursor and polyethylene glycol were mixed in a mass ratio of 40:25, and then performed a fusion treatment for 50 min, where the blade gap was 0.15 cm. Then, the fused material was placed in a high-temperature box furnace, nitrogen was fed, and heat treatment was carried out at 950° C. for 4 hours; and (5) the material obtained in step (4) was pulverized and classified to obtain an anode material.

The anode material prepared by this Example includes carbon material and secondary particles dispersed in the carbon material, where the secondary particle include aggregated primary particles, there is a coating layer of carbon material on surface of the primary particle, and the primary particle includes a nano-silicon particle. The anode material has a median particle diameter $D2_{50}$ of 4.2 μm, a minimum particle size $D2_{min}$ of 0.68 μm, a maximum particle size $D2_{max}$ of 10.5 μm, and a sphericity of 0.86.

Example 6

(1) nano-silicon particles were screened by bulk density tester and Malvern particle size analyzer to obtain a nano-silicon with a median particle size $D1_{50}$ of 150 nm, $D1_{max}$ of 314 nm and a bulk density of 0.68 g/cm$^3$;

(2) the nano-silicon obtained in step (1) and glucose with a mass ratio of 80:68 were placed in propyl alcohol, and then ball milled in a planetary ball mill for 4 hours, and dried by rotary evaporation at 150° C. to obtain a first precursor;

(3) the first precursor was pulverized pre-pulverized and pre-classified to obtain a second precursor with a median particle size of 5.8 μm, and a maximum particle size of 9.8 μm;

(4) the second precursor and titanium nitride were mixed in a mass ratio of 60:55, and then performed a fusion treatment for 40 min, where the blade gap was 0.1 cm. Then, the fused material was placed in a high-temperature box furnace, nitrogen was fed, and heat treatment was carried out at 750° C. for 4 hours; and (5) the material obtained in step (4) was pulverized and classified to obtain an anode material.

The anode material prepared by this Example includes a secondary particle and a titanium nitride layer on surface of the secondary particle, where the secondary particle includes aggregated primary particles, there is a coating layer of carbon material on surface of the primary particle, and the primary particle includes a nano-silicon particle. The anode material has a median particle diameter $D2_{50}$ of 3.2 μm, a minimum particle size $D2_{min}$ of 0.57 μm, a maximum particle size $D2_{max}$ of 8.9 μm, and a sphericity of 0.78.

Example 7

(1) nano-silicon particles were screened by bulk density tester and Malvern particle size analyzer to obtain a nano-silicon with a median particle size $D1_{50}$ of 180 nm, $D1_{max}$ of 478 nm and a bulk density of 0.70 g/cm$^3$;

(2) the nano-silicon obtained in step (1) and glucose with a mass ratio of 60:48 were placed in propanol, and then ball milled in a planetary ball mill for 4 hours, and dried by rotary evaporation at 150° C. to obtain a first precursor;

(3) the first precursor was pulverized pre-pulverized and pre-classified to obtain a second precursor with a median particle size of 12.1 μm, and a maximum particle size of 20.8 μm;

(4) the second precursor and silicon carbide were mixed in a mass ratio of 65:35, and then performed a fusion treatment for 80 min, where the blade gap was 0.15 cm. Then, the fused material was placed in a high-temperature box furnace, nitrogen was fed, and heat treatment was carried out at 850° C. for 4 hours; and (5) the material obtained in step (4) was pulverized and classified to obtain an anode material.

The anode material prepared by this example includes a secondary particle and a silicon carbide layer on surface of the secondary particle, where the secondary particle includes aggregated primary particles, there is a coating layer of carbon material on surface of the primary particle, and the primary particle includes a nano-silicon particle. The anode material has a median particle diameter $D2_{50}$ of 9.0 μm, a minimum particle size $D2_{min}$ of 1.57 μm, a maximum particle size $D2_{max}$ of 17.8 μm, and a sphericity of 0.76.

Example 8

The example was conducted as Example 1 excepting that: in step (4), the second precursor and phenolic resin were mixed in a mass ratio of 50:35, and then the obtained material was placed in a high-temperature box furnace, nitrogen was fed, and heat treatment was carried out at 820° C. for 4 hours.

The anode material prepared by this Example includes carbon material and secondary particles dispersed in the carbon material, where the secondary particle include aggregated primary particles, there is a coating layer of carbon material on surface of the primary particle, and the primary particle includes a nano-silicon particle. The anode material has a median particle diameter $D2_{50}$ of 4.9 μm, a minimum particle size $D2_{min}$ of 0.39 μm, a maximum particle size $D2_{max}$ of 18.4 μm, and a sphericity of 0.94.

Example 9

The example was conducted as Example 1 excepting that: the nano-silicon particles was replaced with nano-germanium particles with a median particle size $D1_{50}$ of 30 nm, $D1_{max}$ of 220 nm and a bulk density of 0.26 g/cm$^3$.

The anode material prepared by this Example includes carbon material and secondary particles dispersed in the carbon material, where the secondary particle include aggregated primary particles, there is a coating layer of carbon material on surface of the primary particle, and the primary particle includes a nano-germanium particle. The anode material has a median particle diameter $D2_{50}$ of 3.5 μm, a minimum particle size $D2_{min}$ of 0.3 μm, a maximum particle size $D2_{max}$ of 12.5 μm, and a sphericity of 0.88.

Example 10

The example was conducted as Example 1 excepting that: the nano-silicon particles was replaced with nano-tin particles with a median particle size $D1_{50}$ of 28 nm, $D1_{max}$ of 185 nm and a bulk density of 0.25 g/cm$^3$.

The anode material prepared by this Example includes carbon material and secondary particles dispersed in the carbon material, where the secondary particle include aggregated primary particles, there is a coating layer of carbon material on surface of the primary particle, and the primary particle includes a nano-tin particle. The anode material has a median particle diameter $D2_{50}$ of 3.6 μm, a minimum particle size $D2_{min}$ of 0.4 μm, a maximum particle size $D2_{max}$ of 10.9 μm, and a sphericity of 0.89.

Example 11

The example was conducted as Example 1 excepting that: in step (4), the phenolic resin was replaced with silicon nitride.

The anode material prepared by this Example includes a secondary particle, where there is a silicon nitride coating layer on surface of the secondary particle, the the secondary particle include aggregated primary particles, there is a coating layer of carbon material on surface of the primary particle, and the primary particle includes a nano-silicon particle. The anode material has a median particle diameter $D2_{50}$ of 3.4 μm, a minimum particle size $D2_{min}$ of 0.5 μm, a maximum particle size $D2_{max}$ of 11.7 μm, and a sphericity of 0.91.

Example 12

The example was conducted as Example 1 excepting that: in step (2), the nano-silicon obtained in step (1) and polyvinyl alcohol with a mass ratio of 100:28 were placed in phenol, and dried by rotary evaporation at 120° C. to obtain a first precursor.

The anode material prepared by this Example includes carbon material and secondary particles dispersed in the carbon material, where the secondary particle include aggregated primary particles, there is a coating layer of carbon material on surface of the primary particle, and the primary particle includes a nano-silicon particle. The anode material has a median particle diameter $D2_{50}$ of 6.0 μm, a minimum particle size $D2_{min}$ of 0.82 μm, a maximum particle size $D2_{max}$ of 22.2 μm, and a sphericity of 0.52.

Example 13

The example was conducted as Example 1 excepting that: the nano-silicon particles was replaced with nano-SiO particles with a median particle size $D1_{50}$ of 80 nm, $D1_{max}$ of 320 nm and a bulk density of 0.36 g/cm$^3$.

The anode material prepared by this Example includes carbon material and secondary particles dispersed in the carbon material, where the secondary particle include aggregated primary particles, there is a coating layer of carbon material on surface of the primary particle, and the primary particle includes a nano-SiO particle. The anode material has a median particle diameter $D2_{50}$ of 4.5 μm, a minimum particle size $D2_{min}$ of 0.4 μm, a maximum particle size $D2_{max}$ of 13.5 μm, and a sphericity of 0.93.

Comparative Example 1

(1) nano-silicon particles were screened to obtain a nano-silicon with a median particle size $D1_{50}$ of 300 nm;
(2) the nano-silicon obtained in step (1) and polyvinyl alcohol with a mass ratio of 100:28 were placed in phenol, and then ball milled in a planetary ball mill for 2 hours, and dried by rotary evaporation at 120° C. to obtain a first precursor;
(3) the first precursor was pulverized pre-pulverized and pre-classified to obtain a second precursor with a median particle size of 7.1 μm, and a maximum particle size of 23.8 μm;
(4) the second precursor and phenolic resin were mixed in a mass ratio of 50:35, and then performed a fusion treatment for 40 min, where the blade gap was 0.1 cm. Then, the fused material was placed in a high-temperature box furnace, nitrogen was fed, and heat treatment was carried out at 820° C. for 4 hours; and
(5) the material obtained in step (4) was pulverized and classified to obtain an anode material.

The anode material prepared by this Comparative Example includes carbon material and secondary particles dispersed in the carbon material, where the secondary particle include aggregated primary particles, there is a coating layer of carbon material on surface of the primary particle, and the primary particle includes a nano-silicon particle. The anode material has a median particle diameter $D2_{50}$ of 7.2 μm, a minimum particle size $D2_{min}$ of 0.42 μm, a maximum particle size $D2_{max}$ of 33.8 μm, and a sphericity of 0.89.

Comparative Example 2

The example was conducted as Example 1 excepting that: treatments of pulverizing and classifying were not conducted.

The anode material prepared by this Comparative Example includes carbon material and secondary particles dispersed in the carbon material, where the secondary particle include aggregated primary particles, there is a coating layer of carbon material on surface of the primary particle, and the primary particle includes a nano-silicon particle. The anode material has a median particle diameter $D2_{50}$ of 5.2 μm, a minimum particle size $D2_{min}$ of 0.31 μm, a maximum particle size $D2_{max}$ of 33.8 μm, and a sphericity of 0.67.

Comparative Example 3

The example was conducted as Example 1 excepting that: the primary particular used has a $D1_{max}$ of 0.3 μm.

The anode material prepared by this Comparative Example includes carbon material and secondary particles dispersed in the carbon material, where the secondary particle include aggregated primary particles, there is a coating layer of carbon material on surface of the primary particle, and the primary particle includes a nano-silicon particle. The anode material has a $D2_{50}$ of 2 μm, a $D2_{min}$ of 0.3 μm, a $D2_{max}$ of 15 μm, and a sphericity of 0.67.

Test Methods:

1. The median particle diameter, the minimum particle size and the minimum particle size of the material were tested by a Malvern particle size analyzer according to a standard of ISO13320: 2009.
2. The bulk density of the material was tested by a bulk density tester.
3. The specific surface area of the material was tested by a specific surface area tester.
4. The porosity of the material was tested by static volumetric method or mercury intrusion method.
5. The sphericity of the material was tested by a sphericity analyzer.
6. The electrochemical cycling performance was tested by the following method:

Dissolving the anode material, a conductive agent, and a binders in a mass percent of 94:1:5 in water for mixing, controlling solid content to be 50%, then applying to a copper foil current collector, vacuum drying, to prepare an anode plate; and then assembling a 18650 cylindrical single cell by conventional production process by further using a ternary cathode plate (lithium nickel-cobalt-manganate NCM523) prepared by a conventional production process, 1 mol/L of electrolyte including lithium hexafluorophosphate $LiPF_6$/(ethylene carbonate EC+dimethyl carbonate DMC+ methyl ethyl carbonate EMC) (v/v=1:1:1), Celgard 2400 separator, and shell. The charge and discharge testing of the cylindrical battery was performed by a LAND cell test system produced by Wuhan Jinnuo Electronics Co., Ltd, under room temperature conditions, charging and discharging at 0.2 C constant current, and the charge and discharge voltage was controlled to 2.75 V to 4.2 V. The initial reversible capacity and the initial coulomb efficiency (ICE) of the battery were obtained. At a current density of 1 C, the battery was repeatedly charged and discharged for 100 times in a charging and discharging range of 0.01 V to 5 V, and the capacity retention rate and the plate expansion rate after 50 cycles were obtained.

The testing results are shown in Tables 1 and 2.

TABLE 1

Physical and chemical properties of the anode material prepared by the Examples and Comparative Examples.

| Samples | $D1_{max}$ (μm) | $D2_{min}$ (μm) | $D2_{50}$ (μm) | $D2_{max}$ (μm) | $D2_{min}/D2_{50}$ | $D2_{50}/D2_{max}$ | $D2_{50}/D1_{max}$ |
|---|---|---|---|---|---|---|---|
| Example 1 | 0.155 | 0.6 | 3.6 | 10.8 | 0.16 | 0.33 | 23.2 |
| Example 2 | 0.103 | 0.32 | 1.8 | 5.8 | 0.18 | 0.31 | 17.4 |
| Example 3 | 0.111 | 0.78 | 4.3 | 14.5 | 0.18 | 0.30 | 38.7 |
| Example 4 | 0.249 | 1.08 | 8.2 | 16.5 | 0.13 | 0.5 | 32.9 |
| Example 5 | 0.115 | 0.68 | 4.2 | 10.5 | 0.16 | 0.4 | 36.5 |
| Example 6 | 0.314 | 0.57 | 3.2 | 8.9 | 0.17 | 0.36 | 10.2 |
| Example 7 | 0.478 | 1.57 | 9.0 | 17.8 | 0.17 | 0.51 | 18.8 |
| Example 8 | 0.155 | 0.39 | 4.9 | 18.4 | 0.08 | 0.26 | 31.6 |
| Example 9 | 0.220 | 0.3 | 3.5 | 12.5 | 0.09 | 0.28 | 15.9 |
| Example 10 | 0.185 | 0.4 | 3.6 | 10.9 | 0.11 | 0.33 | 19.4 |
| Example 11 | 0.155 | 0.5 | 3.4 | 11.7 | 0.14 | 0.29 | 21.9 |
| Example 12 | 0.155 | 0.82 | 6.0 | 22.2 | 0.13 | 0.27 | 38.7 |
| Example 13 | 0.32 | 0.4 | 4.5 | 13.5 | 0.089 | 0.33 | 14.0 |
| Comparative Example 1 | 0.867 | 0.42 | 7.2 | 33.8 | 0.06 | 0.21 | 8.3 |
| Comparative Example 2 | 0.584 | 0.31 | 5.2 | 33.8 | 0.06 | 0.15 | 8.9 |
| Comparative Example 3 | 0.300 | 3 | 2 | 15 | 1.5 | 0.13 | 6.67 |

TABLE 2

Comparison of performance parameters of the anode material prepared by Examples and Comparative Examples.

| Samples | Specific surface area ($g/cm^3$) | Porosity (%) | Initial reversible capacity (mAh/g) | Initial coulomb efficiency (%) | Capacity retention rate after 100 cycles (%) | Plate expansion rate after 50 cycles (%) |
|---|---|---|---|---|---|---|
| Example 1 | 5.3 | 4.9 | 1710 | 88.1 | 93.1 | 36.1% |
| Example 2 | 3.4 | 3.3 | 1658 | 86.2 | 91.2 | 41.1% |
| Example 3 | 5.1 | 2.9 | 1541 | 88.9 | 94.1 | 34.5% |
| Example 4 | 1.9 | 5.9 | 1641 | 88.7 | 92.8 | 35.9% |
| Example 5 | 3.2 | 3.2 | 1640 | 87.2 | 93.9 | 35.1% |
| Example 6 | 2.9 | 6.3 | 1609 | 88.1 | 92.2 | 39.0% |
| Example 7 | 4.8 | 6.9 | 1570 | 89.9 | 91.1 | 40.3% |
| Example 8 | 3.7 | 7.3 | 1710 | 86.1 | 90.1 | 46.1% |

TABLE 2-continued

Comparison of performance parameters of the anode material prepared by Examples and Comparative Examples.

| Samples | Specific surface area ($g/cm^3$) | Porosity (%) | Initial reversible capacity (mAh/g) | Initial coulomb efficiency (%) | Capacity retention rate after 100 cycles (%) | Plate expansion rate after 50 cycles (%) |
|---|---|---|---|---|---|---|
| Example 9 | 6.8 | 3.2 | 870 | 87.3 | 94.6 | 29.1% |
| Example 10 | 7.8 | 6.3 | 870 | 87.3 | 94.6 | 34.1% |
| Example 11 | 8.4 | 2.8 | 1620 | 88.3 | 93.6 | 35.5% |
| Example 12 | 7.4 | 14.3 | 1583 | 85.0 | 83.9 | 45.4% |
| Example 13 | 2.2 | 2.4 | 1344 | 77.8 | 94.4 | 36.5% |
| Comparative Example 1 | 6.8 | 10.2 | 1589 | 85.8 | 85.5 | 52.2% |
| Comparative Example 2 | 5.6 | 11.3 | 1613 | 84.9 | 87.9 | 48.6% |
| Comparative Example 3 | 7.8 | 6.8 | 920 | 87.5 | 93.2 | 50.6% |

From the data in the above Table 1 and Table 2, it can be seen that for the anode material prepared by Examples 1-12, the primary particle and the secondary particle satisfy the following relationships: $10 \leq D2_{50}/D1_{max} \leq 40$, $D2_{min}/D2_{50} \geq 0.08$, and $D2_{50}/D2_{max} \geq 0.24$, such that the primary particle and the secondary particle have a good matching degree with each other, finally amount of fine powder in the anode material is reduced, and particle size distribution of the secondary particle is concentrated, which improve cycling stability of the anode material and at the same time reduce volume expansion effect of the anode material.

For the anode material prepared by Comparative Example 1, the decrease of adhesion among the primary particles due to excessive particle size of the nano-silicon particles leads to a large volume expansion of the anode material, an increased cracking rate of the secondary particle during charging and discharging, and a small retention rate of cycle capacity.

For the anode material prepared by Comparative Example 2, because no treatment of pulverizating and classifying were preformed, the particle size distribution of the anode material is wide and there is a certain amount of fine powder, which leads to a large volume expansion of the material.

For the anode material prepared by Comparative Example 3, even though the individual parameters of $D2_{50}$, $D1_{max}$, $D2_{max}$ and $D2_{min}$ are all within the optimal ranges, respectively, they do not satisfy the relationships of $10 \leq D2_{50}/D1_{max} \leq 40$ and $D2_{50}/D2_{max} \geq 0.24$, which leads to a large volume expansion of the anode material.

The foregoing is only a preferred embodiment of the present application and is not intended to limit the present application, and various modifications and changes can be made to the present application for those skilled in the art. Any modifications, equivalent substitutions, improvements, etc. within the spirit and principles of the present application are intended to be included in the scope of protection.

What is claimed is:

1. An anode material, wherein the anode material comprises a secondary particle, the secondary particle comprises aggregated primary particles, and the primary particle and the secondary particle satisfy following relationships:

$$10 \leq D2_{50}/D1_{max} \leq 40 \quad \text{(I)}$$

$$D2_{min}/D2_{50} \geq 0.08 \quad \text{(II)}$$

$$D2_{50}/D2_{max} \geq 0.24 \quad \text{(III)}$$

in Formulas (I), (II) and (III), $D1_{max}$ represents a maximum particle size of the primary particle, $D2_{50}$ represents a median particle size of the secondary particle, $D2_{min}$ represents a minimum particle size of the secondary particle, and $D2_{max}$ represents a maximum particle size of the secondary particle.

2. The anode material of claim 1, wherein the anode material comprises at least one of the following features (1) to (7):

(1) the primary particle comprises at least one of Li, Na, $SiO_x$ (0<x<2), K, Sn, Ge, Si, Fe, Mg, Ti, Zn, Al, P, and Cu;

(2) the primary particle has a volume density of less than or equal to 0.7 $g/cm^3$;

(3) the primary particle has a median particle size $D1_{50}$ of less than or equal to 0.2 μm;

(4) the secondary particle has a median particle size $D2_{50}$ ranging from 0.5 μm to 20 μm;

(5) the primary particle has a maximum particle size $D1_{max}$ ranging from 0.1 μm to 0.4 μm;

(6) the secondary particle has a minimum particle size $D2_{min}$ ranging from 0.5 μm to 4 μm; and (7) the secondary particle has a maximum particle size $D2_{max}$ ranging from 6 μm to 20 μm.

3. The anode material of claim 1, wherein the anode material comprises at least one of the following features (1) to (3):

(1) the anode material has a specific surface area of less than or equal to 10 $m^2/g$;

(2) the anode material has a porosity of less than or equal to 10%; and (3) the anode material has a sphericity of more than or equal to 0.7.

4. The anode material of claim 1, wherein the anode material further comprises a coating layer on at least part of surfaces of the primary particle and/or the secondary particle.

5. The anode material of claim 4, wherein the coating layer comprises at least one of the following features (1) to (5):

(1) a material of the coating layer comprises at least one of carbon material, graphene, silicon carbide, metal oxide, and nitride;

(2) a material of the coating layer comprises carbon material, wherein the carbon material comprises at least one of soft carbon, hard carbon, crystalline carbon, and amorphous carbon;

(3) a material of the coating layer comprises metal oxide, wherein the metal oxide comprises at least one of titanium oxide, aluminum oxide, lithium oxide, cobalt oxide, and vanadium oxide;

(4) a material of the coating layer comprises nitride, wherein the nitride comprises at least one of titanium nitride, vanadium nitride, cobalt nitride, nickel nitride, and carbon nitride; and (5) the coating layer has a thickness of 1 nm to 500 nm.

6. A preparation method of an anode material, comprising:

granulating a mixture containing a primary particle and a binder to obtain a precursor;

performing a heat treatment on the precursor to carbonize the binder to obtain a heat-treated product; and pulverizing the heat-treated product and classifying so that a secondary particle obtained by the classifying and the primary particle satisfy following relationship:

$$10 \leq D2_{50}/D1_{max} \leq 40 \quad \text{(I)}$$

$$D2_{min}/D2_{50} \geq 0.08 \quad \text{(II)}$$

$$D2_{50}/D2_{max} \geq 0.24, \quad \text{(III)}$$

to obtain the anode material, in Formulas (I), (II) and (III), $D1_{max}$ represents a maximum particle size of the primary particle, $D2_{50}$ represents a median particle size of the secondary particle, $D2_{min}$ represents a minimum particle size of the secondary particle, and $D2_{max}$ represents a maximum particle size of the secondary particle.

7. The preparation method of claim 6, wherein the preparation method comprises at least one of following features (1) to (15):

(1) the primary particle has a median particle size of less than or equal to 0.2 μm;

(2) the primary particle comprises at least one of Li, $SiO_x$ (0<x<2), Na, K, Sn, Ge, Si, Fe, Mg, Ti, Zn, Al, P, and Cu;

(3) the binder comprises at least one of starch, cellulose, tannin, arabic gum, sodium alginate, styrene-butadiene rubber, butyl rubber, cellulose ester, vinyl polymer, polyamide, polyacrylate, epoxy resin, phenolic resin, furan resin, unsaturated polyester, acrylic resin, and polyimide;

(4) a mass ratio of the primary particle and the binder is 100:(5-55);

(5) the mixture containing a primary particle and a binder further comprises a solvent;

(6) the mixture containing a primary particle and a binder further comprises a solvent, wherein the solvent comprises at least one of phenol, alcohol solvent, ether solvent, and alkane solvent;

(7) the mixture containing a primary particle and a binder further comprises a solvent, wherein a mass ratio of the solvent and the primary particle is 100:(5-40);

(8) before the step of granulating a mixture containing a primary particle and a binder, the preparation method further comprises: performing dispersion treatment on the mixture containing a primary particle and a binder;

(9) before the step of granulating a mixture containing a primary particle and a binder, the preparation method further comprises: performing dispersion treatment on the mixture containing a primary particle and a binder, wherein the dispersion treatment comprises at least one of magnetic stirring, mechanical stirring, grinding dispersion, and ultrasonic dispersion;

(10) the heat treatment has a temperature of 500° C. to 1000° C.;

(11) the heat treatment has a holding time of 30 min to 900 min;

(12) the heat treatment is performed under a protective atmosphere, wherein the protective atmosphere comprises at least one of nitrogen, argon, and helium;

(13) a material obtained by the pulverizing has a median particle size of 0.5 μm to 15 μm;

(14) a material obtained by the pulverizing has a maximum particle size of 5 μm to 45 μm; and

(15) after the classifying, the preparation method further comprises: removing particles with a particle size of less than or equal to 0.5 μm from a material obtained by the classifying.

8. The preparation method of claim 6, wherein the preparation method comprises at least one of following features (1) to (5):

(1) before the step of performing a heat treatment on the precursor to carbonize the binder, the preparation method further comprises: pre-pulverizing and pre-classifying the precursor;

(2) before the step of performing a heat treatment on the precursor to carbonize the binder, the preparation method further comprises: pre-pulverizing and pre-classifying the precursor, wherein the pre-pulverizing comprises at least one of mechanical pulverization, jet pulverization, ultrafine pulverization, wet pulverization, compression pulverization, and splitting pulverization;

(3) before the step of performing a heat treatment on the precursor to carbonize the binder, the preparation method further comprises: pre-pulverizing and pre-classifying the precursor, wherein a material obtained by the pre-pulverizing has a median particle size of 0.5 μm to 20 μm;

(4) before the step of performing a heat treatment on the precursor to carbonize the binder, the preparation method further comprises: pre-pulverizing and pre-classifying the precursor, wherein a material obtained by the pre-pulverizing has a maximum particle size of 5 μm to 45 μm; and (5) before the step of performing a heat treatment on the precursor to carbonize the binder, the preparation method further comprises: pre-pulverizing and pre-classifying the precursor, wherein a material obtained by the pre-classifying has a particle size of more than 0.5 μm.

9. The preparation method of claim 6, wherein the preparation method comprises at least one of following features (1) to (7):

(1) before the step of performing a heat treatment on the precursor to carbonize the binder, the preparation method further comprises: performing a fusion treatment on the precursor with a coating material;

(2) before the step of performing a heat treatment on the precursor to carbonize the binder, the preparation method further comprises: performing a fusion treatment on the precursor with a coating material, wherein the coating material comprises at least one of carbon source, graphene, silicon carbide, metal oxide, and nitride;

(3) before the step of performing a heat treatment on the precursor to carbonize the binder, the preparation method further comprises: performing a fusion treatment on the precursor with a coating material, wherein the coating material comprises carbon source, and the carbon source comprises at least one of sucrose, glucose, polyethylene, polyvinyl alcohol, polyethylene glycol, polyaniline, epoxy resin, phenolic resin, furfural resin, acrylic resin, polyethylene oxide, polyvinylidene fluoride, polyacrylonitrile, polyvinyl chloride, and pitch;

(4) before the step of performing a heat treatment on the precursor to carbonize the binder, the preparation method further comprises: performing a fusion treatment on the precursor with a coating material, wherein the coating material comprises metal oxide, and the metal oxide comprises at least one of titanium oxide, aluminum oxide, lithium oxide, cobalt oxide, and vanadium oxide;

(5) before the step of performing a heat treatment on the precursor to carbonize the binder, the preparation method further comprises: performing a fusion treatment on the precursor with a coating material, wherein the coating material comprises nitride, and the nitride comprises at least one of titanium nitride, vanadium nitride, cobalt nitride, nickel nitride, and carbon nitride;

(6) before the step of performing a heat treatment on the precursor to carbonize the binder, the preparation method further comprises: performing a fusion treatment on the precursor with a coating material, wherein an equipment for the fusion treatment comprises at least one of a mechanical fusion machine, a fusion mixer, and a convection fusion machine; and (7) before the step of performing a heat treatment on the precursor to carbonize the binder, the preparation method further comprises: performing a fusion treatment on the precursor with a coating material, wherein the fusion treatment has a duration of 30 min to 150 min.

10. A secondary battery, comprising the anode material according to claim 1.

* * * * *